(12) United States Patent
Johnston et al.

(10) Patent No.: US 8,073,809 B2
(45) Date of Patent: Dec. 6, 2011

(54) GRAPHICAL MODEL FOR DATA VALIDATION

(75) Inventors: Carolyn Johnston, Redmond, WA (US); Manuel Reyes-Gomez, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 12/244,444

(22) Filed: Oct. 2, 2008

(65) Prior Publication Data

US 2010/0088267 A1 Apr. 8, 2010

(51) Int. Cl.
*G06F 15/18* (2006.01)
(52) U.S. Cl. ........................................................ 706/62
(58) Field of Classification Search ...................... 706/62
See application file for complete search history.

(56) References Cited

U.S. PATENT DOCUMENTS

| 6,128,587 | A | 10/2000 | Sjolander |
| 7,249,034 | B2 * | 7/2007 | Schirmer et al. ............... 705/344 |
| 2007/0005341 | A1 | 1/2007 | Burges et al. |
| 2008/0004096 | A1 | 1/2008 | Graepel et al. |
| 2008/0059391 | A1 | 3/2008 | Rosales et al. |

FOREIGN PATENT DOCUMENTS

| WO | WO-0070481 | 11/2000 |
| WO | WO-2006065464 A2 | 6/2006 |

OTHER PUBLICATIONS

Wang et al., "Mining Geographic Knowledge Using Location Aware Topic Model," http://delivery.acm.org/10.1145/1320000/1316967/p65-xie.pdf?key1=1316967&key2=4388605121&coll=&dl=&CFID=76400927&CFTOKEN=64541509.
Bhattacharya et al., "A Latent Dirichlet Allocation Model for Entity Resolution," http://www.cs.umd.edu/~getoor/Publications/cs-tr-4740.pdf.
Luo et al., "Graphical Models for Diagnosis Knowledge Representation and Inference," http://ieeexplore.ieee.org/iel5/10700/33790/01609185.pdf?isnumber=33790&prod=CNF&arnumber=1609185&arSt=+483&ared=+489&arAuthor=Jianhui+Luo%3B+Haiying+Tu%3B+Pattipati%2C+K.%3B+Liu+Qiao%3B+Shunsuke+Chigusa.
Daume et al., "A Bayesian Model for Supervised Clustering with the Dirichlet Process Prior," Hal Daume III and Daniel Mareu, 2000, http://www.isi.edu/~marcu/papers/daume05dpscm.pdf.

* cited by examiner

*Primary Examiner* — Michael B Holmes

(57) ABSTRACT

Data may be received from the source and based on training; a confidence level may be determined that a specific element in the data is correctly assigned to a master category given that the source assigned the data to one of the plurality of assigned source categories. If the confidence level meets a threshold, the element may be stored in the assigned master category and if the confidence level does not meet a threshold, the element may be stored for reassignment.

18 Claims, 4 Drawing Sheets

GRAPHICAL MODEL FOR DATA VALIDATION

BACKGROUND

This Background is intended to provide the basic context of this patent application and it is not intended to describe a specific problem to be solved.

Data is everywhere in modern society. Trying to organize the data is a significant challenge. One way is to categorize the data. However, not everyone categorizes data the same. Some sources of data are very careful to add useful categories to elements of data while others use automated tools that often produce error filled categorization. Trying to determine if data is truly assigned to a proper category is difficult as it often requires human intervention whenever new data is received. As human intervention is expensive, attempts have been made to automate the assignment of data with varying degrees of success.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system of determining whether an element from a source has been properly assigned to a category by the source is disclosed. The method may be trained. The training may entail reviewing previous data from the source where the data includes an element and an assigned source category for the element. The source category for the current element may be mapped to a master category. The mapping may be reviewed to determine if each assigned source category is correct. The method may store whether the mapping was correct for each assigned source category and the training may be complete. Additional data may be received from the source and based on the training; a confidence level may be determined that a specific element in the data is correctly assigned to a master category given that the source assigned the data to one of the plurality of assigned source categories. If the confidence level meets a threshold, the element may be stored in the assigned master category and if the confidence level does not meet a threshold, the element may be stored for reassignment.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
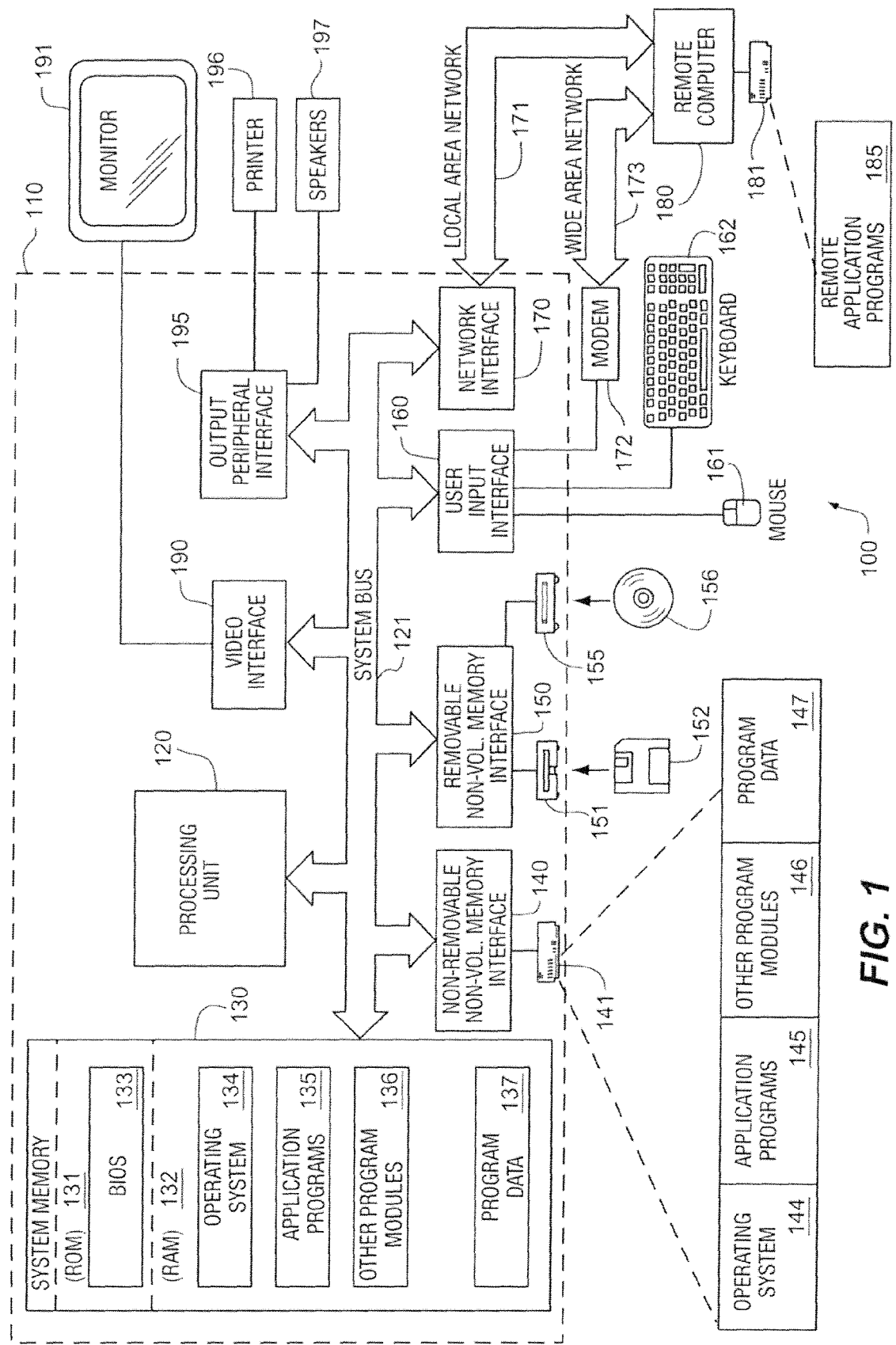
FIG. 1 is an illustration of a computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures 132, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

Figure 2:
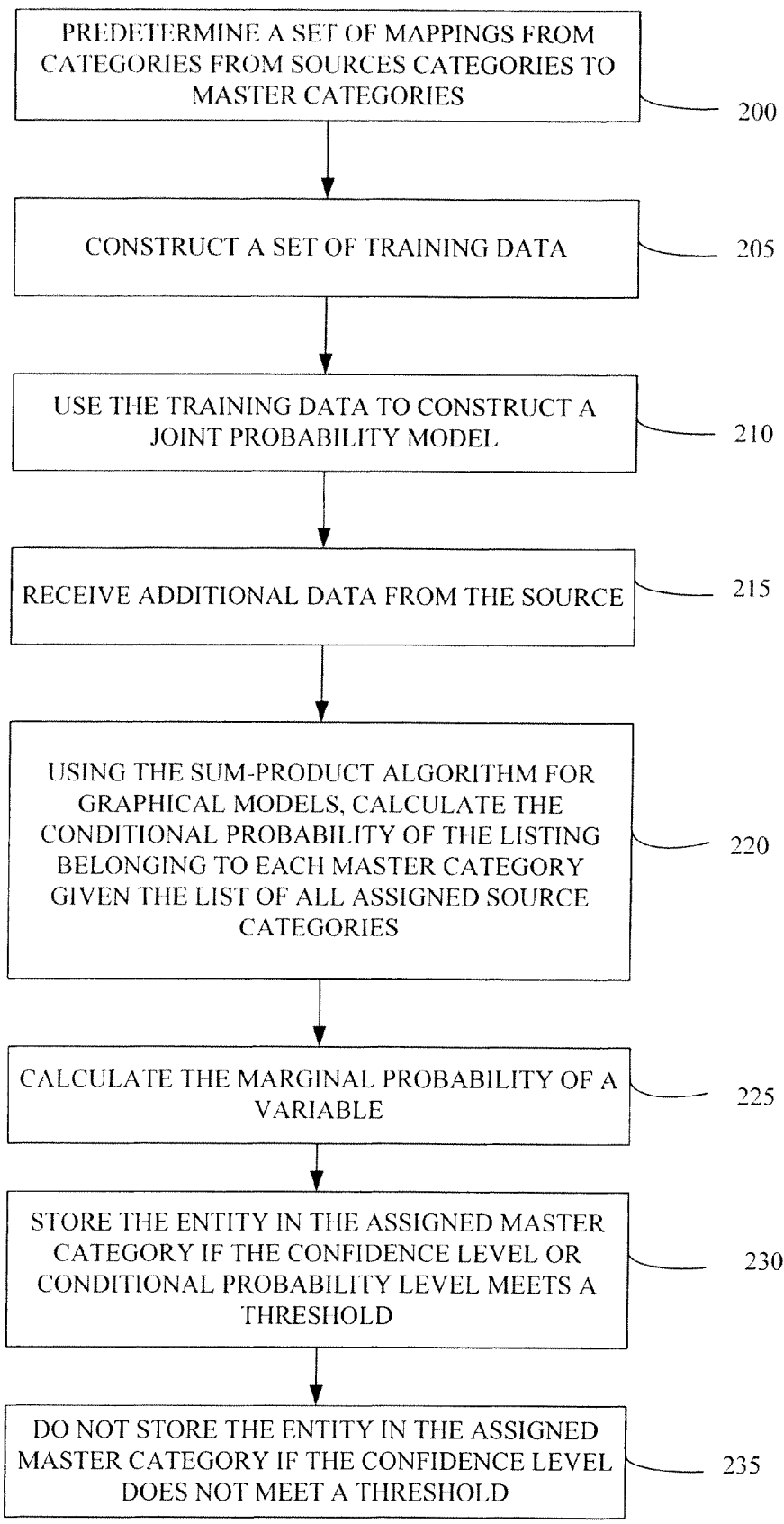
FIG. 2 is an illustration of a method of determining whether an element from a source has been properly assigned to a category by the source.

FIG. 2 may illustrate a method of determining whether an element from a source has been properly assigned to a category by the source using a computer system, such as the computer system described in FIG. 1. The method may be an inference method for modeling probabilities of correctness of element assignments to taxonomy of categories. The inference method uses training data consisting of raw category assignments (with possible errors) by multiple providers, together with manual assignments of Master Category 410 labels for each entity. The technique used to model the problem may be graphical modeling; the technique used to solve the model for the necessary probabilities may be the Sum-Product algorithm. The model may be flexible in that it can assume varying probability distribution complexity models; it is also extensible to include, for example, additional parameters from auxiliary fields in the large data set element.

At a high level, the method may take in data from a source where each element in the data may be classified into the Source's 400 405 own categorization taxonomy. Some sources provide data with excellent classifications that match a master classification index very closely. Other sources provide data that is classified in a more haphazard manner. As a result, such data cannot be trusted to be immediately filed in the master classification.

The method may take in training data from a source, and match the elements and the given classification in the data to a master classification. The given classification may then be reviewed to see of the given classification is correct in view of the master classification. If the classification is correct, this may be stored. Once the training data is complete, a probability density function is created for all the master categories and the assigned Source 400 405 categories. Then, using a sum total algorithm, the method determines a confidence level that the element has been properly assigned by the source given that it was assigned to a certain classification by the source.

Figure 3:
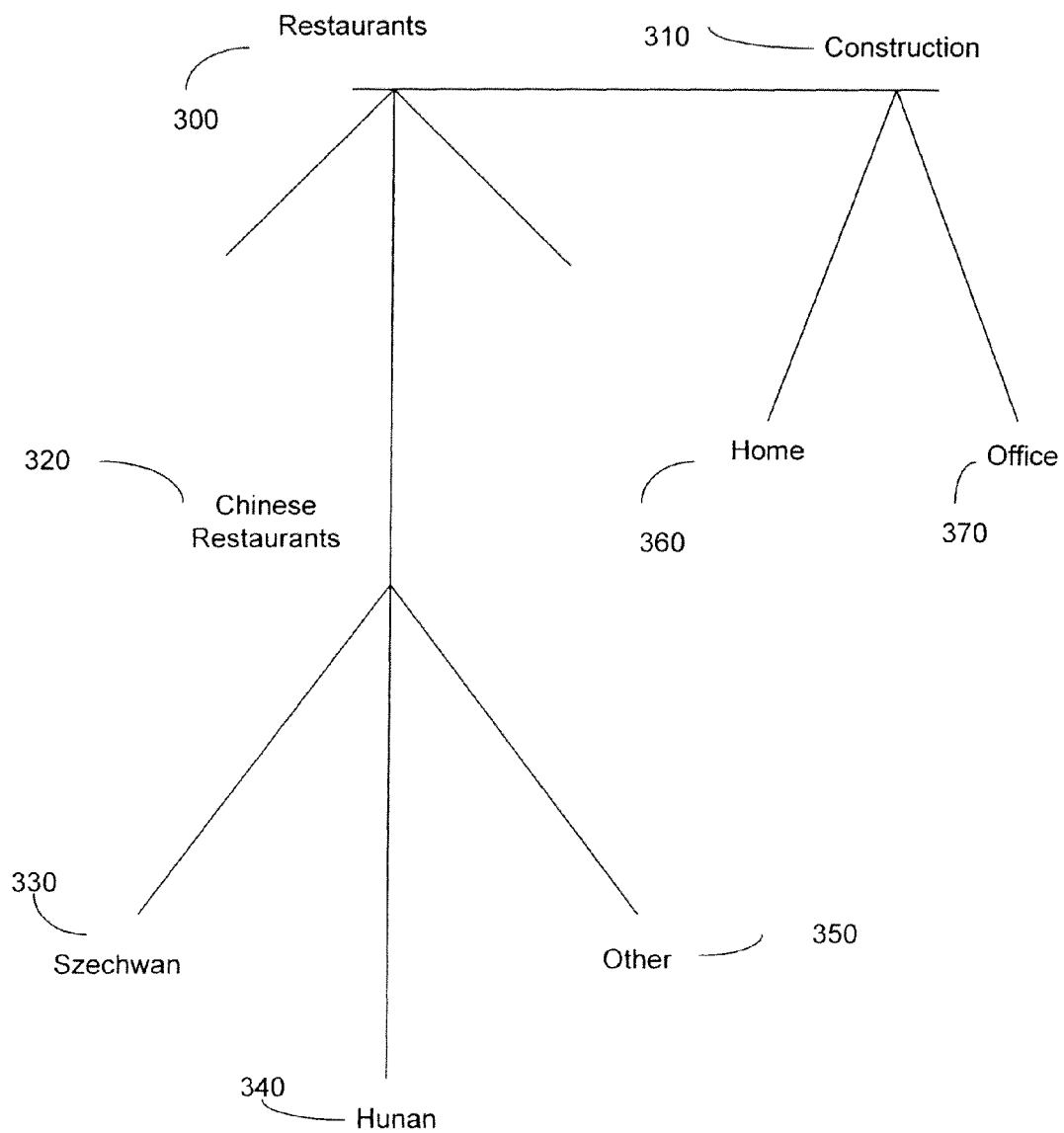
FIG. 3 is an illustration of a tree with categories, parent nodes and children nodes.
Figure 4:
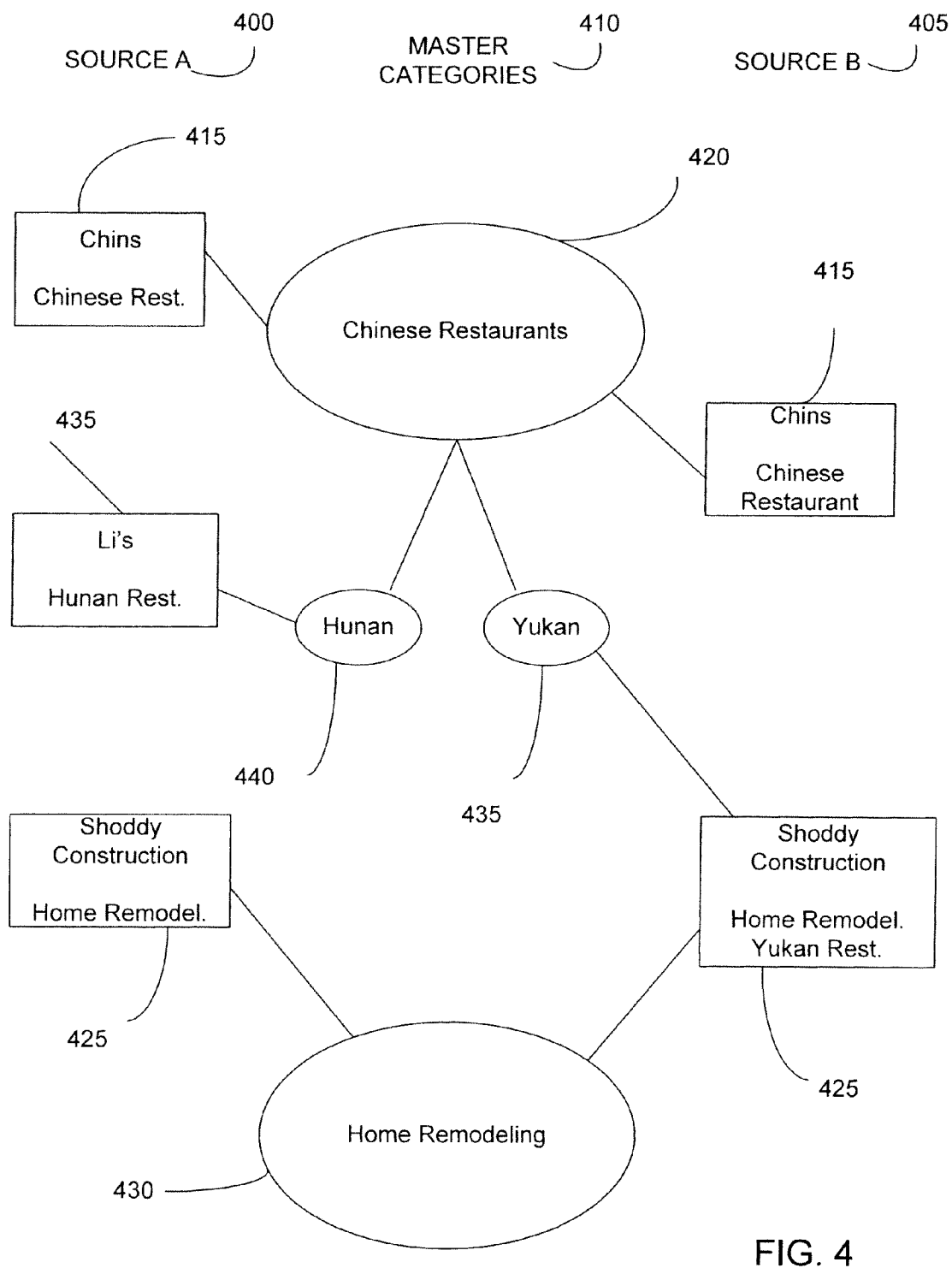
FIG. 4 is an illustration of source categories being assigned to master categories where the master categories have children categories.

Referring to FIG. 3 for example and not limitation, there may be master categories for restaurants 300, and construction 310. Under restaurants 300, there may be Chinese restaurants 310 and under construction businesses 310, there may be construction business-home 360 and construction business-office 370. In addition, under Chinese Restaurants, there may be type of Chinese restaurants such as Szechwan 330, Hunan 340 and Other 350. The categories from the source may be mapped to categories in the master. The categories may be matched using traditional manners of matching characters or searching for categories known to be similar. Past experience may be used to guide the mapping. Of course, other method of mapping between the source and the master categories are possible and are contemplated. FIG. 4 may illustrate one sample mapping scenario.

In FIG. 4, Source A 400 and Source B 405 may map the entries to master categories 410. Both Source A and Source B may assign Chins 415 to the Chinese Restaurant 420 category. Source A 400 may assign Shoddy Construction 425 to Home Remodeling 430 while Source B 405 may assign Shoddy Construction 425 to Home Remodeling 430 and to Yutan 435 which may be a child of Chinese Restaurants 420. The assignment of Shoddy Construction 425 to Yutan 435 by Source B may be in error. Like any graph, the graph in FIG. 4 may have nodes and nodes may be parents or children. When assigning a category 410 to an element 415 425 435, the tree may be traversed and the element 415 425 435 may be assigned to the lowest appropriate leaf on the tree. Traversal may be accomplished by examining down past a parent node to the children nodes to see if an appropriate category is located. In addition, if an element 415 425 435 is assigned to a child, the method may also traverse the graph and assign the element 415 425 435 to the parent. For example, in FIG. 4, Li's 435 may be categorized as a Hunan Restaurant 440, so the method may automatically assign Li's as also being a Chinese Restaurant 420.

Referring again to FIG. 2, at block 200, a set of mappings of categories from Sources 400 405 to Master Categories 410 may be predetermined. The mapping may occur in any logical manner.

At block 205, a training data set of data may be constructed. For each training set sample, identical listings from Sources 400 and 405 may be conflated to represent a single business entity 415 425 using an application or matching by a human. A single sample of the training data may consist of the totality of source category assignments made to a single entity 415 425 by the Source Providers 400 405, together with an assignment of the entity 415 425 to a master category or set of master categories 420 430 435 440. The assignment of the entity to a master category is usually made by a human labeler.

At block 210, the training data may then be used to construct a joint probability model for all Source and Master Categories. The joint probability of a set of (discrete) random variables is a mathematical function which describes the probability that the set of random variables has a specific set of values. In an embodiment using graphical models, the joint probability model is first calculated using the training data from block 505 and then stored for use during entity classification.

To simplify the calculation of the joint probability, it is assumed that the probability of an entity's belonging to a Source Category depends only upon whether it belongs to the Master Category 410 to which it is mapped. If an entity belongs to a child Master Category 435 440, it also belongs to the child's Parent Master Category 420. If training data is sparse, the joint probability model may be regularized. The training portion of the process may be complete.

At block 215, additional data may be received from the Source 400 405. The processing of the additional data may also be referred to as entity processing. During entity processing, when a new business listing is received for categorization into a Master Category 410 from multiple Sources 400 405, the listings from each Source 400 405 are first resolved into a single entity, and the set of all assigned Source Categories is aggregated. For example, Source A 400 and Source B 405 may both submit Chins Chinese Restaurant 415 and Source A 400 and Source B 405 may be resolved into a single entity and then the set of all assigned Source Categories from Source A 400 and Source B 405 for Chins would be aggregated.

At block 220, the conditional probability of the listing belonging to each Master Category 410, given the list of all assigned Source Categories, is then calculated using the sum-product algorithm for graphical models. This algorithm functions by passing positive real vector valued messages across edges in a graphical model such as the model described previously. More precisely, in trees: a vertex sends a message to an adjacent vertex if (a) it has received messages from all of its other adjacent vertices and (b) hasn't already sent one. So in the first iteration, the algorithm sends messages from all leaf nodes to each of the lone vertices adjacent to those respective leaves and continues sending messages in this manner until all messages have been sent exactly once, hence explaining the term propagation. It may be proven that all messages will be sent (there are twice the number of edges of them).

At block 225, upon termination of the sum-product algorithm, the marginal probability of a variable is determined where the marginal probability is the product of the incoming messages of all its adjacent vertices. This marginal probability may be viewed as a confidence level for the Master Category assignment of the elements 415 425 435.

At block 230, if the confidence level or conditional probability level for a given Master Category meets a threshold, the element 415 425 435 may be stored in the assigned master category. At block 235, if the confidence level does not meet a threshold, the element 415 425 435 may not be stored in the assigned master category. The element 415 425 435 may be stored in a separate location where it may be reviewed by a human for proper reassignment.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of determining whether an element from a source has been properly assigned to a category by the source comprising:
   Receiving data from the source;
   Based on a training routine, determining a confidence level that a specific element in the data is correctly assigned to a master category given that the source assigned the data to one of the plurality of assigned source categories;
   If confidence level meets a threshold, store the element in the assigned master category; and
   If the confidence level does not meet a threshold, storing the element for reassignment.

2. The method of claim 1, wherein the master categories are placed as nodes in a graph and the assigned source categories are related to the nodes in the graph.

3. The method of claim 2, wherein the graph has nodes and nodes may be parents or children.

4. The method of claim 2, wherein the nodes of graph are traversed.

5. The method of claim 2, further comprising if an element has been assigned to a child node, also assigning the element to a parent node.

6. The method of claim 2, further comprising iterating through the categories in an attempt to assign an element to the most specific category.

7. The method of claim 2, wherein the confidence level is calculated using a sum product algorithm.

8. The method of claim 2, further comprising calculating a joint probability density function of all master categories and all source categories.

9. A computer storage medium comprising computer executable code for executing a method of determining whether an element from a source has been properly assigned to a category by the source, the computer code comprising code for:
   Receiving data from the source;
   Based on a training routine, determining a confidence level that a specific element in the data is correctly assigned to a master category given that the source assigned the data to one of the plurality of assigned source categories;
   If confidence level meets a threshold, store the element in the assigned master category; and
   If the confidence level does not meet a threshold, storing the element for reassignment.

10. The computer storage medium of claim 9,
    wherein the master categories are placed as nodes in a graph and the assigned source categories are related to the nodes in the graph;
    wherein the graph has nodes and nodes may be parents or children; and
    wherein the nodes of graph are traversed.

11. The computer storage medium of claim 9, further comprising computer executable code for determining the conditional probability that the assignment is correct given the training routine wherein the training routine comprises:
    Reviewing a mapping from a training sample to determine if each assigned source category is correct; and
    Storing whether the mapping was correct for each assigned source category.

12. The computer storage medium of claim 9, further comprising computer executable code for assigning the element to a parent node if an element has been assigned to a child node.

13. The computer storage medium of claim 9, further comprising computer executable code for iterating through the categories in an attempt to assign an element to the most specific category.

14. The computer storage medium of claim 9, further comprising computer executable code for
    using a sum product algorithm to calculate a confidence level, and
    calculating a joint probability density function of all master categories and all source categories.

15. A computer system comprising:
    a processor configured according to computer executable instructions,
    a memory in communication with the processor and
    an input output circuit,
        the computer executable instructions comprising instruction for executing a method of determining whether an element from a source has been properly assigned to a category by the source, the computer instructions comprising instructions for:
            Receiving data from the source;
            Based on a training routine, determining a confidence level that a specific element in the data is correctly assigned to a master category given that the source assigned the data to one of the plurality of assigned source categories;

If confidence level meets a threshold, store the element in the assigned master category;

If the confidence level does not meet a threshold, storing the element for reassignment;

wherein the master categories are placed as nodes in a graph and the assigned source categories are related to the nodes in the graph;

wherein the graph has nodes and nodes may be parents or children; and wherein the nodes of graph are traversed.

16. The computer system of claim 15, further comprising computer executable instruction for determining the conditional probability that the assignment is correct given the training routine wherein the training routine comprises:

Reviewing a mapping from a training sample to determine if each assigned source category is correct; and Storing whether the mapping was correct for each assigned source category.

17. The computer system of claim 15, further comprising computer executable code for assigning the element to a parent node if an element has been assigned to a child node.

18. The computer system of claim 15, further comprising computer executable code for using a sum product algorithm to calculate a confidence level, and calculating a joint probability density function of all master categories and all source categories.

* * * * *